US006071367A

United States Patent [19]

Petkovsek

[11] Patent Number: 6,071,367

[45] **Date of Patent: *Jun. 6, 2000**

[54] METHOD FOR FORMING A MAILPIECE

[76] Inventor: Glenn Petkovsek, 20 Tortoise Park Cove, Little Rock, Ark. 72211

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,528

[22] Filed: May 14, 1997

Related U.S. Application Data

[60] Division of application No. 08/714,214, Sep. 16, 1996, abandoned, which is a continuation-in-part of application No. 08/398,748, Mar. 6, 1995, abandoned.

[51] Int. Cl.[7] .......... B32B 31/00

[52] U.S. Cl. .......... 156/227; 156/252; 156/253; 156/256; 156/277; 283/98; 283/101; 283/103; 283/105; 283/106; 493/233; 493/356; 493/399; 493/919

[58] Field of Search .......... 156/227, 252, 156/256, 217, 277, 253; 229/300; 493/233, 356, 399, 919; 283/98, 101, 103, 105, 106

[56] References Cited

U.S. PATENT DOCUMENTS

| | | | |
|---|---|---|---|
| 1,043,243 | 11/1912 | Mitchell | 229/92.3 |
| 1,311,397 | 7/1919 | Herter | 229/92.8 |
| 2,279,164 | 4/1942 | Gettleman | 283/56 |
| 2,983,431 | 5/1961 | Turan | 229/92.3 |
| 2,985,464 | 5/1961 | McFarland | 283/58 |
| 3,406,894 | 10/1968 | Settle | 229/70 |
| 3,837,565 | 9/1974 | Johnsen | 229/68 R |
| 3,937,492 | 2/1976 | Biron | 282/25 |
| 4,682,793 | 7/1987 | Walz | 282/11.5 A |
| 4,918,128 | 4/1990 | Sakai | 524/450 |
| 4,951,864 | 8/1990 | Dicker | 229/80 |
| 5,174,493 | 12/1992 | File | 229/301 |
| 5,183,203 | 2/1993 | Sanders | 229/300 |
| 5,201,464 | 4/1993 | File | 229/305 |
| 5,203,851 | 4/1993 | Browning et al. | 283/81 |
| 5,253,798 | 10/1993 | Lombardo | 229/92.1 |
| 5,366,145 | 11/1994 | Sauerwine | 229/304 |
| 5,553,774 | 9/1996 | Goodno | 229/303 |
| 5,595,404 | 1/1997 | Skees | 283/116 |
| 5,622,390 | 4/1997 | Jenkins | 283/116 |
| 5,890,647 | 4/1999 | Petkovsek | 229/92.1 |

FOREIGN PATENT DOCUMENTS

| | | |
|---|---|---|
| 2225000 | 10/1974 | France . |
| 2 190652 | 11/1987 | United Kingdom . |

*Primary Examiner*—Richard Crispino
*Assistant Examiner*—Linda L Gray
*Attorney, Agent, or Firm*—Patents & TMS, P.C.

[57] ABSTRACT

A method for forming and using a mailpiece requiring special services is provided. The method includes providing a mailpiece having an integral document section requiring special service mailing that includes folding the sheet along fold lines and sealing the mailpiece to enclose the integral document section. The method further includes providing a removably attached section which, after the system is folded and sealed, forms a return postcard and at least one form. The return postcard and the form are integrally formed, but removably attached. The method includes removing the return postcard when the mailpiece is received by the addressee.

5 Claims, 11 Drawing Sheets

FIG.7
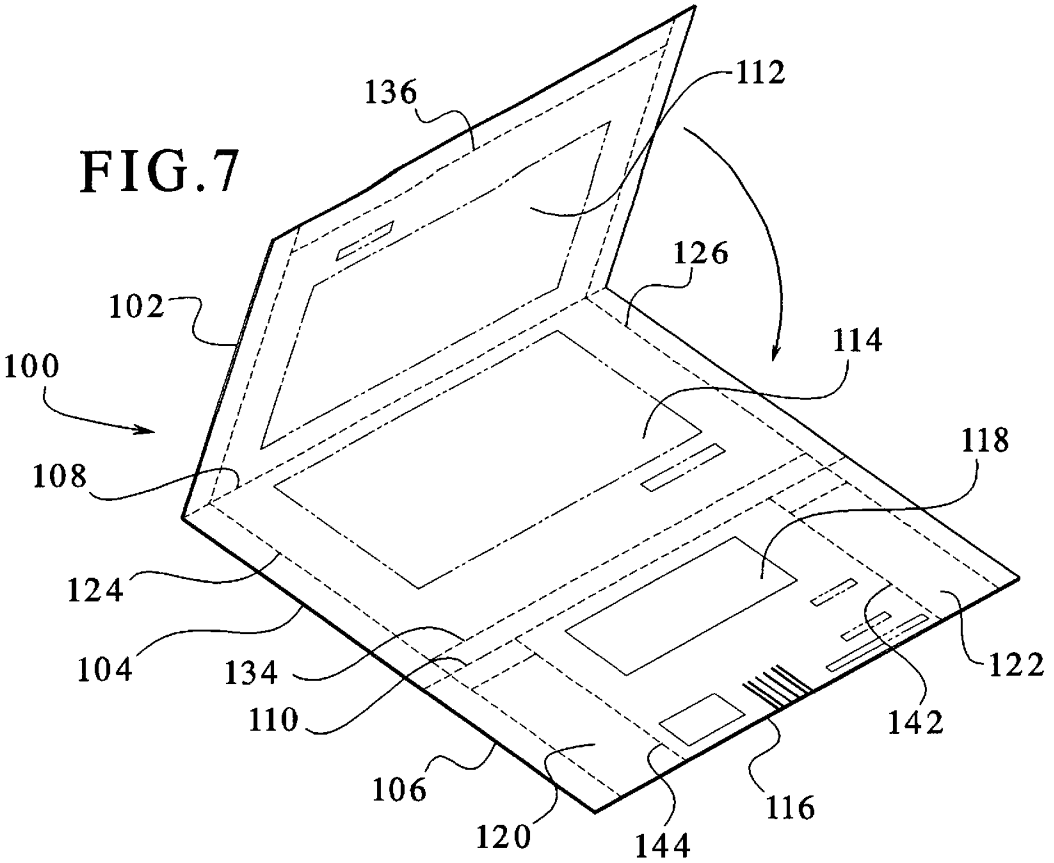
FIG.8
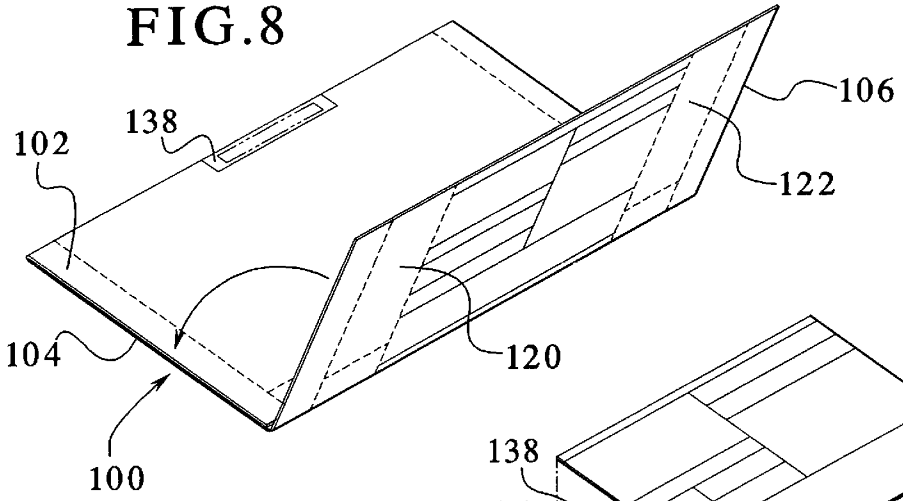
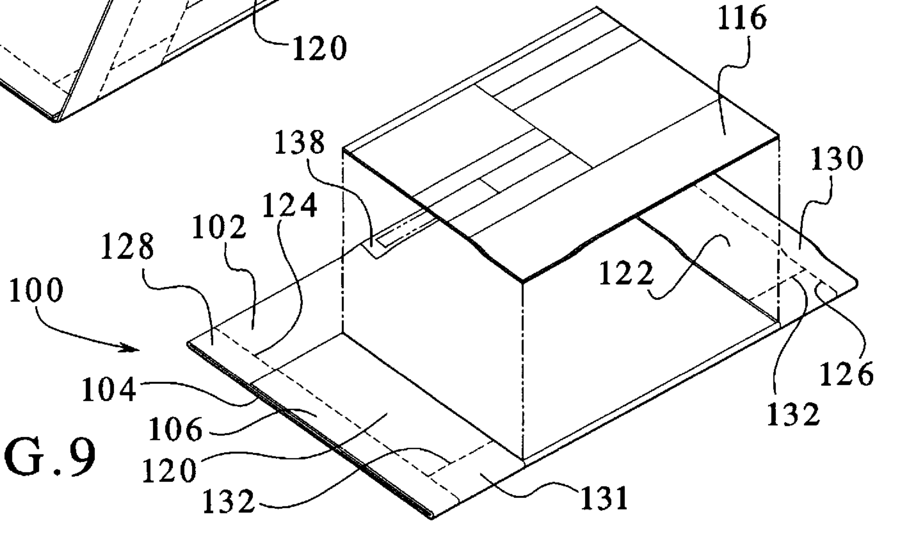
FIG.9

FIG.11
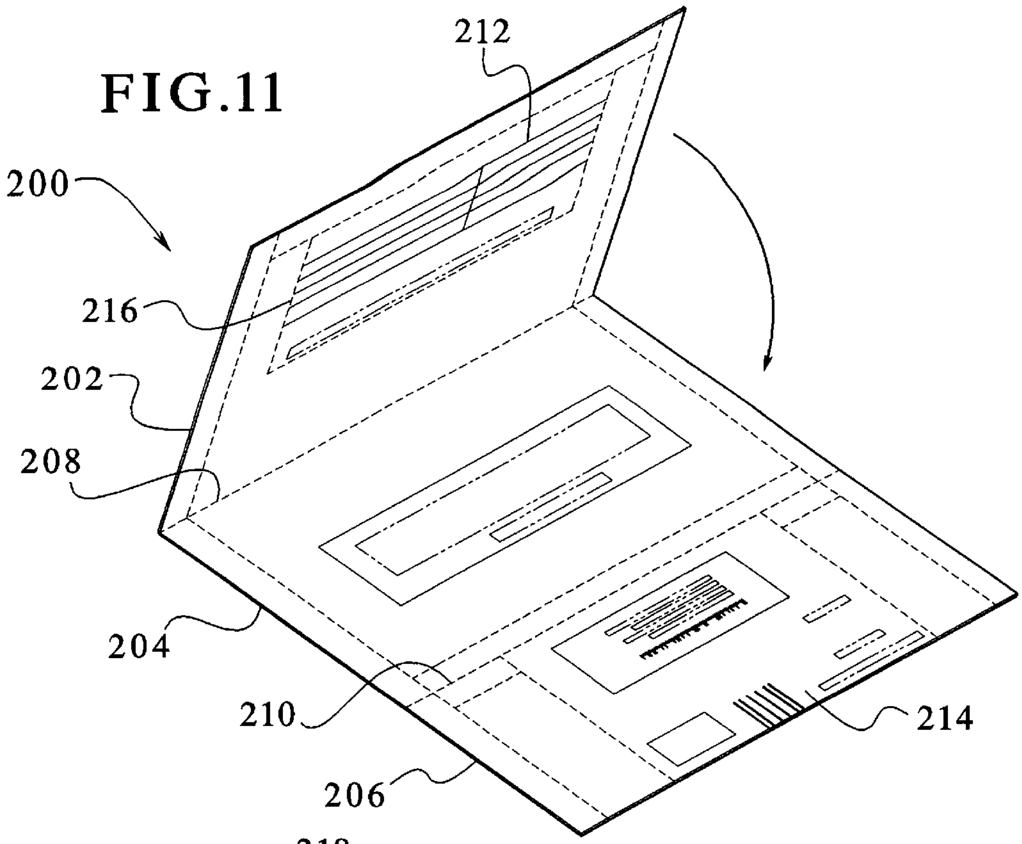
FIG.12
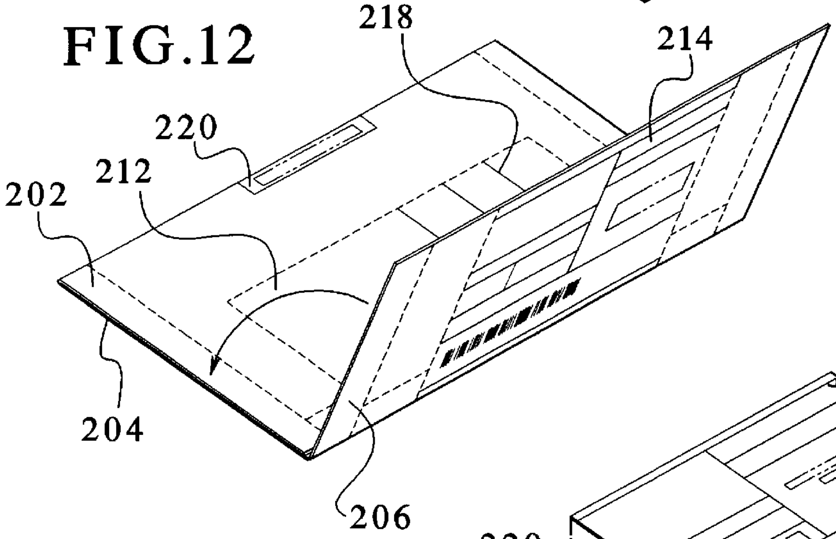
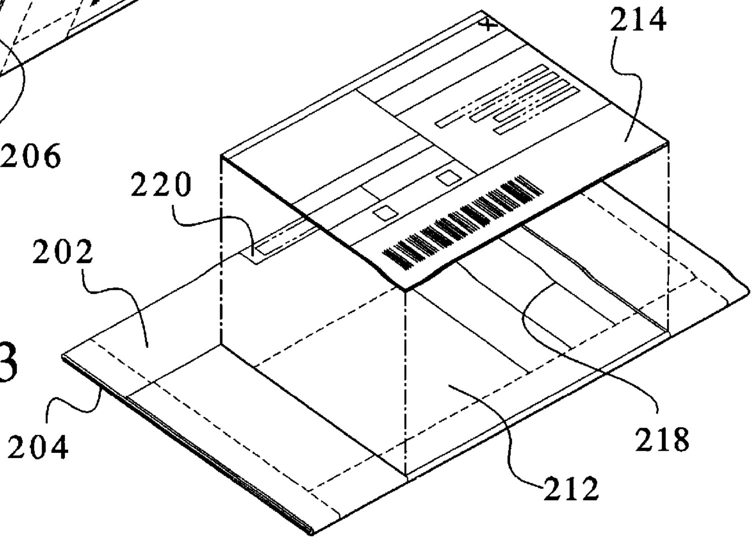
FIG.13

METHOD FOR FORMING A MAILPIECE

CROSS REFERENCE TO RELATED APPLICATION

This application is a divisional application of U.S. patent application Ser. No. 08/714,214 filed Sep. 16, 1996, now abandoned, which is a continuation-in-part application of U.S. patent application Ser. No. 08/398,748 filed Mar. 6, 1995, now abandoned.

BACKGROUND OF THE INVENTION

The present invention generally relates to a combined form and envelope for mailing an article requiring special services. More specifically, the present invention relates to a combined special service mailpiece having an integral document section requiring special services wherein a detachable form and return postcard are also attached to the mailpiece prior to assembly thereof.

It is, of course, generally known to mail an article requiring special services for delivery of the article, such as certified mail, registered mail, insured mail, COD, return receipt for merchandise and the like. Known components and methods for assembling a mailer for mailing an article requiring special services have multiple, separate components requiring attachment to an exterior of an envelope for the special services delivery of the article.

For example, when a customer of the U.S. Postal Service requires an article to be mailed by certified mail, for example, an envelope containing the article is provided to the postal employee by the customer. The postal employee is then required to attach or otherwise provide the envelope with a permanent seal or label indicating that the envelope requires delivery by certified mail.

Then, a return postcard requiring attachment to the envelope, must be completed by the postal employee and/or the customer mailing the envelope containing the article. Some postcards include areas having an adhesive for attachment of the postcard to the envelope. Other postcards require separate attachment, such as using tape, for example.

Such a procedure is both complex and time-consuming, as well as labor intensive. The procedure requires the postal employee to ensure that all of the appropriate labels and documents are affixed to the envelope prior to delivery of the article. Therefore, the appropriate forms, labels and the like must be adequately stocked and available for the postal employee. Further, the postal employee must ensure that all articles are appropriately affixed to the envelope.

In addition, the return postcard must be suitably affixed such that the return postcard is not removed during the mailing of the article to its destination. Of course, it should be understood that an envelope being prepared for special service mailing may be prepared by any individual, not just a postal employee.

A need, therefore, exists for an improved mailpiece requiring special services having an integral document section that can be pre-printed along with the mailpiece requiring special services and a system for forming the mailpiece requiring special services, such as certified mail, insured mail, registered mail, COD, return receipt for merchandise and the like.

SUMMARY OF THE INVENTION

The present invention provides a special service mailpiece and a method for forming the mailpiece requiring special services, such as for certified mail, insured mail, register mail, COD, return receipt for merchandise and the like. The mailpiece includes an integral document section requiring special mailing service, including a sheet foldable into sections along a fold line to form the integral document section and a removably attached section which, after the sheet is folded and sealed, forms a return postcard.

To this end, in an embodiment of the present invention, a mail assembly requiring delivery with special services is provided. The mail assembly has a sheet having a front side and a back side wherein the sheet has a length defining three sections. Tear lines perpendicular to the length of the sheet are provided wherein the tear lines separate the three sections of the form. A first form in one of the three sections is detachable from a remainder of the section.

In an embodiment, a second form in another one of the three sections detachable from a remainder of the section is provided.

In an embodiment, the first form is a return postcard.

In an embodiment, the first form is a money order.

In an embodiment, the second form is a money order.

In an embodiment, perforated tear lines are provided along the length of the sheet on opposite sides of the sheet across substantially an entire width of the sheet.

In an embodiment, an adhesive section is provided on the front side of the sheet adhering the three sections after folding at the tear lines.

In an embodiment, the first form is a return postcard for certified mail.

In an embodiment, a designation is provided on the sheet identifying a type of special service required for the mail assembly.

In another embodiment of the present invention a method is provided for assembling a mailpiece requiring special services. The method comprises the steps of: providing a sheet having a front side and a back side capable of receiving printed information therein; dividing the sheet into three distinct sections separated by perforated tear lines perpendicularly disposed with respect to a length of the sheet; folding the sheet at the perforated tear lines to define a multi-layer mailpiece; and providing a first detachable section in one of the three distinct sections capable of removal from a remainder of the one of the three distinct sections.

In an embodiment, the first detachable section is a return postcard.

In an embodiment, the first detachable section is a money order.

In an embodiment, a second detachable section is provided in another one of the three distinct sections capable of removal from a remainder of the another one of the three distinct sections and adhering the sheet after folding.

In an embodiment, an adhesive is provided on one side of the sheet.

In an embodiment, a designation is provided on one side of the sheet indicative of the special service required for the mailpiece.

It is, therefore, an advantage of the present invention to provide an improved system for mailing an article requiring special services.

Another advantage of the present invention is to provide a simplified method for forming a mailpiece requiring special services.

And, another advantage of the present invention is to provide a system and an assembly that is integrally formed as a complete unit for mailing and designation of an article requiring special services.

Yet another advantage of the present invention is to provide a system for mailing an article and a method for forming a mailpiece requiring special services without requiring additional adhesives or fixatives for attaching the same to the mailpiece.

Moreover, an advantage of the present invention is to provide a system for mailing an article requiring special services and a method for forming a mailpiece requiring special services that is substantially foolproof.

Additional features and advantages of the present invention are described in, and will be apparent from, the detailed description of the presently preferred embodiments and from the drawings.

BRIEF DESCRIPTION OF THE DRAWINGS

FIG. 7 illustrates a perspective view of another embodiment of a system of the present invention.

FIG. 8 illustrates a perspective view of the embodiment illustrated in FIG. 7 with two ends of the system folded.

FIG. 9 illustrates a perspective view of the embodiment illustrated in FIGS. 7 and 8 with a return postcard removed from a remainder of the system.

FIG. 11 illustrates a perspective view of another embodiment of a system of the present invention.

FIG. 12 illustrates a perspective view of an embodiment of the system illustrated in FIG. 11 with two ends folded.

FIG. 13 illustrates a perspective view of an embodiment of the system illustrated in FIGS. 11 and 12 with a return postcard removed therefrom.

DETAILED DESCRIPTION OF THE PRESENTLY PREFERRED EMBODIMENTS

The present invention provides a special service mailpiece having an integral document section requiring special services. Further, the present invention provides a method for forming a mailpiece requiring special services.

Figure 1:
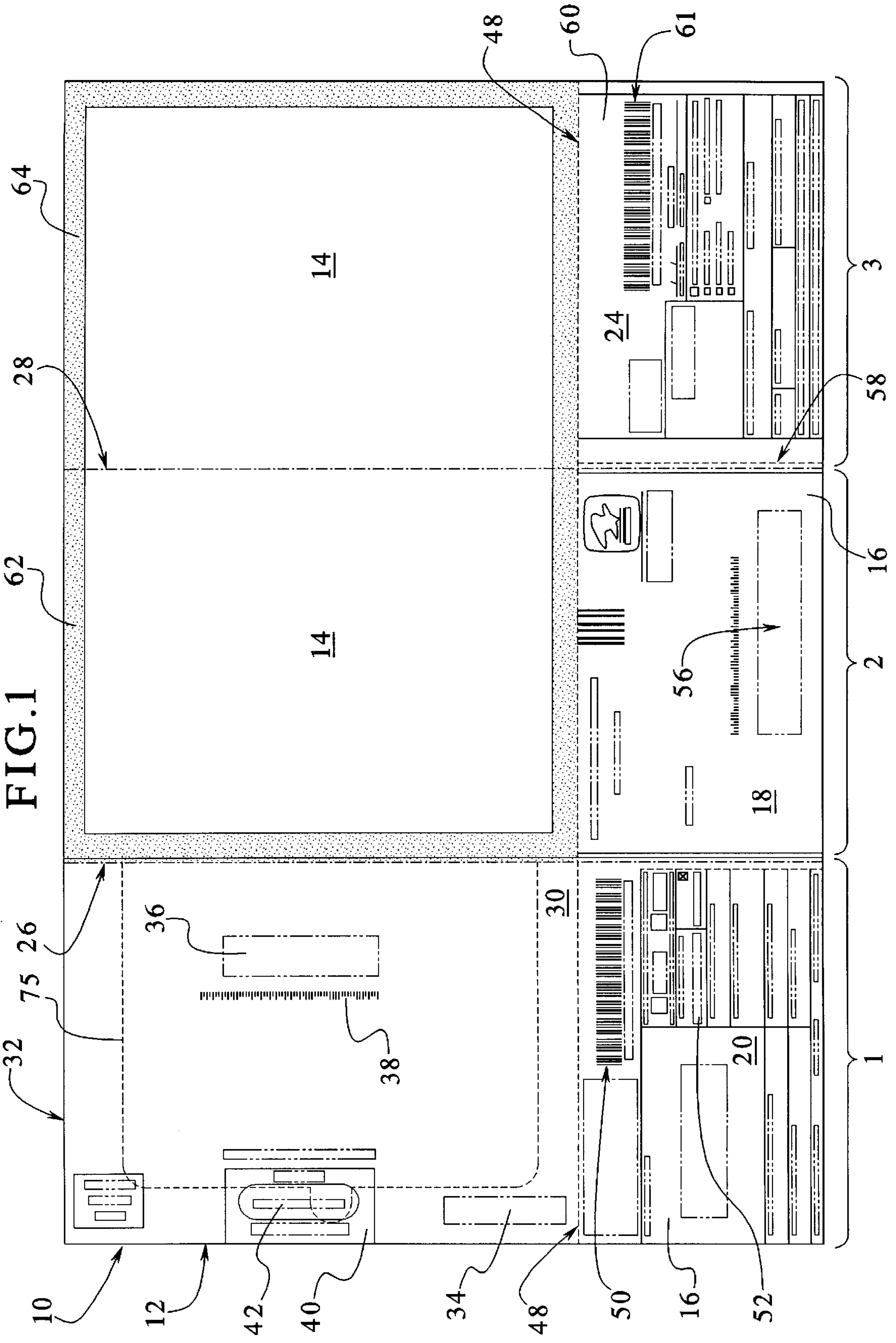
FIG. 1 illustrates a plan view of a front side of an embodiment of an assembly of the present invention.

Referring now to the drawings, wherein like numerals refer to like parts, FIG. 1 generally illustrates an assembly 10 formed from a single sheet 12 folded in a manner to provide: a personalized document portion 14 and a two-ply return postcard 16 having a front side 18 and a back side 20 used for the mailing of the personalized document portion 14 requiring a special mailing service. In addition, a delivery notice/reminder/receipt 24 is provided. Although a certified mail envelope is illustrated, it should be understood that the present invention is applicable to any mailing item requiring special services, such as insured mail, registered mail, COD, return receipt for merchandise and the like.

The assembly 10 illustrated in FIG. 1 on its front side comprises three primary sections, 1, 2 and 3. Section 1 of the assembly 10 is located adjacent to section 2 and has a fold line 26 therebetween as a demarcation line between the two sections 1, 2. Similarly illustrated in FIG. 1, section 2 is adjacent to section 3 and has a fold line 28 forming a common border between the two sections 2, 3. A description of the three sections 1, 2 and 3 follows.

Section 1 of the front side of the assembly 10 comprises a front side 30 of an envelope 32. The envelope 32 has a sender's address section 34 and an addressee address section 36. The addressee address section 36 also has a computer bar code 38 to aid in processing.

The envelope 32 of the assembly 10 includes, in a preferred embodiment, a pre-printed label 40 indicative of the special service required for mailing of the assembly 10. The label 40 is preferably pre-printed directly on the envelope 32 of the assembly 10.

The pre-printed label 40 includes a window section 42 including an article identification number. The preprinted label 40 is constructed and arranged such that the type of special service required for mailing of the assembly 10 is visible from both the front side 30 of the envelope 32 and a back side 44 of the envelope 32 as more clearly illustrated in FIG. 2.

Section 1 also comprises the back side 20 of the return receipt postcard 16. The return receipt postcard 16 is removably attached to the assembly 10 and can be detached by tearing the return receipt postcard 16 away from the assembly 10 along a perforation tear line 48. The perforation tear line 48 runs the length of the assembly 10.

As mentioned above, section 1 of the assembly 10 includes the back side 18 of the return postcard 16. The return postcard 16 has a number of sub-sections requiring completion by the sender prior to mailing the assembly 10 to the addressee in the addressee address section 36 of the envelope 32. One sub-section illustrated at numeral 50 includes a machine readable article identification number corresponding to the number in the window section 42 of the pre-printed label 40. The sub-section 50 may have a contrasting background color to the remainder of the return postcard 16 so as to simplify the reading of the machine-readable code in sub-section 50. Other sections, as well, may include similar color-contrasting portions within the return postcard 16. The backside 20 of the return receipt postcard 16 may also include a sub-section 52 including machine-readable indicia with the article identification number corresponding to the number in the sub-section 50 and to the number in the window section 42 of the pre-printed label 40.

Now referring to Section 2 of the front side of the assembly 10, the return postcard 16 of the assembly 10 includes on its front side 18, a "Return To" section 56. The "Return To" section 56 may be color-contrasted with the remainder of the return postcard to enable simplified reading of the "Return To" section 56. A perforated tear line 58 is provided along the right exterior side of the return postcard

16 which is adjacent to Section 3 of the assembly 10. After tearing along the perforated tear line 58, a postal employee can tear along the perforated tear line 48 to detach the return postcard 16 from the assembly 10.

With reference now to Section 3 of the assembly, as illustrated in FIG. 1, in a preferred embodiment, a combined delivery notice/reminder/receipt form 60 is provided. This delivery notice/reminder/receipt form 60 is preferably U.S. Postal Service Form PS 3849. A bar code 61 bearing the article number is provided on the delivery notice/reminder/receipt 60.

Referring to both sections 2 and 3 in conjunction, the personalized document portion 14 is shown having a mid-point at fold line 28. In addition, in section 2 around the periphery of the personalized document portion 14 is a first adhesive strip 62. A similar second adhesive strip 64 is provided around the periphery of the personalized document section 14 in section 3. The fold line 28 provides the border between the first adhesive strip 62 and the second adhesive strip 64. When the assembly 10 is folded, and proper pressure is applied, the first and second adhesive strips 62, 64 will provide an adequate adhesion level so that the document can be securely folded.

Figure 2:
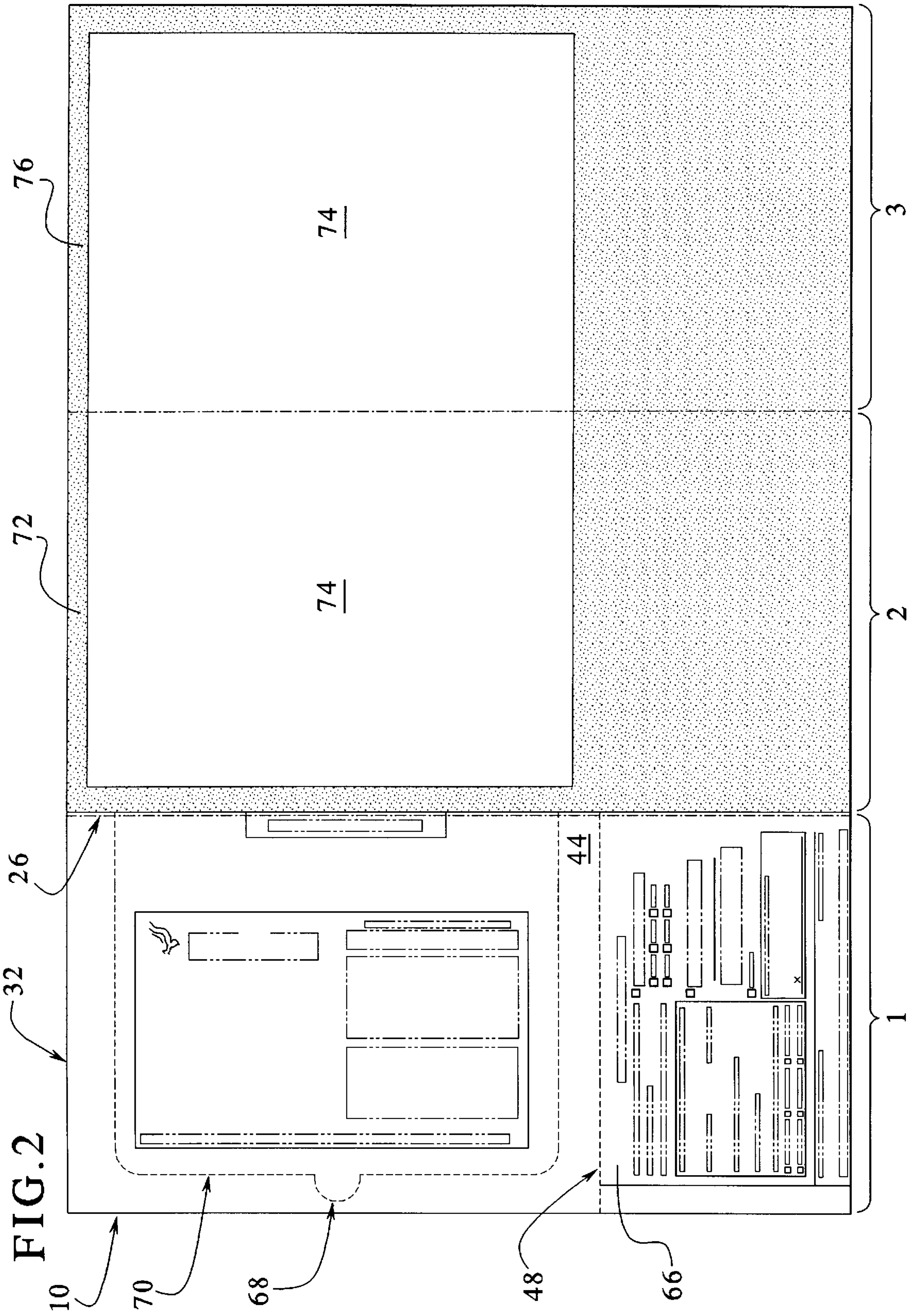
FIG. 2 illustrates a plan view of a back side of an embodiment of the assembly of the present invention.

Referring now to FIG. 2, a back side of the assembly 10 is illustrated. The back side 44 of the envelope 32 shown in FIG. 1 is, therefore, illustrated. Section 1 of the back side of the assembly 10 includes a back side 66 of the delivery notice/reminder/receipt 60 and the back side 44 of the envelope 32 separated by the perforated tear line 48.

In an embodiment, the back side 44 of the envelope 32 includes a die cut thumb groove 68 that operates in cooperation with a perforated tear line 70 to allow access to the interior of the envelope 32 for reading the personalized document portion 14.

Referring now to section 2 of the back side 20 of the assembly 10, a second document section 74 is provided. A perforated tear line 75 (see FIG. 1), similar to the perforated tear line 70, is provided to allow access to the second document section 74. When the document sections 14 and 74 are used, access to messages printed on the document sections 14 and 74 may be obtained by separating at the perforated tear lines 70 and/or 75 and folding back the sections to view the document sections 14 and/or 74 and their respective printed messages.

It should be understood that the second document section 74 is an option. The present invention may have either one of the document sections 14, 74 or both of them. However, the printing of the assembly is simplified when the document section 14 is used, since this document section 14 is on the front side of the assembly 10 as is all of the other variable printing.

Also on section 2, a first adhesive section 72 is provided about the periphery of a second personalized document section 74. Similarly, section 3 of the assembly 10 has a second adhesive section 76 located about the periphery of the second personalized document section 74. In addition, the first adhesive section 72 is continued on the lower portion of the back side of the assembly 10 and the female portion of the adhesive section 76 is continued at the bottom portion of section 3 so that the adhesive sections 72 and 76 combine to form an enclosed surface and a return postcard 16. For example, the large portions of the first adhesive section 72 and the second adhesive section 76 are in contact thereby bonding the front side 18 and the back side 20 of the return postcard 16 to form the return postcard 16.

Figure 3:
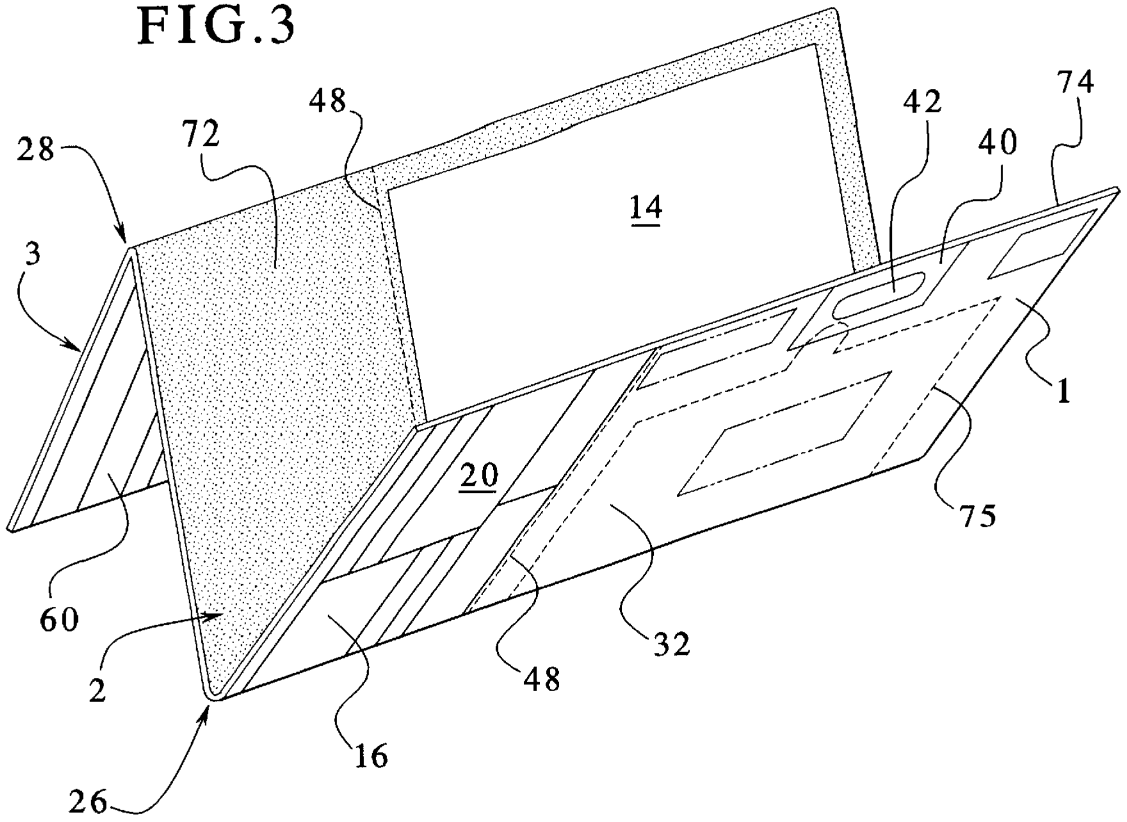
FIG. 3 illustrates a perspective view of an embodiment of a partially folded assembly of the present invention.

Referring to FIGS. 3–6, the front side of a partially folded assembly 10 is illustrated in FIG. 3, in which like numbers represent like parts. The assembly 10 is also shown in an unsealed condition. As illustrated in FIG. 3, certain elements of the assembly 10 are shown in relation to each other as they will be connected upon completion of the assembly 10. For example, the back side 20 of the return postcard 16 is illustrated folded along fold line 26 so that it comes into contact with the first adhesive section 72 that is applied to the back of the front side 18 of the return postcard 16 so that when connected they form an integral postcard 16. The pre-printed label 40 is shown having a window section 42 in which a certified mail number may be printed either manually or automatically.

Figure 4:
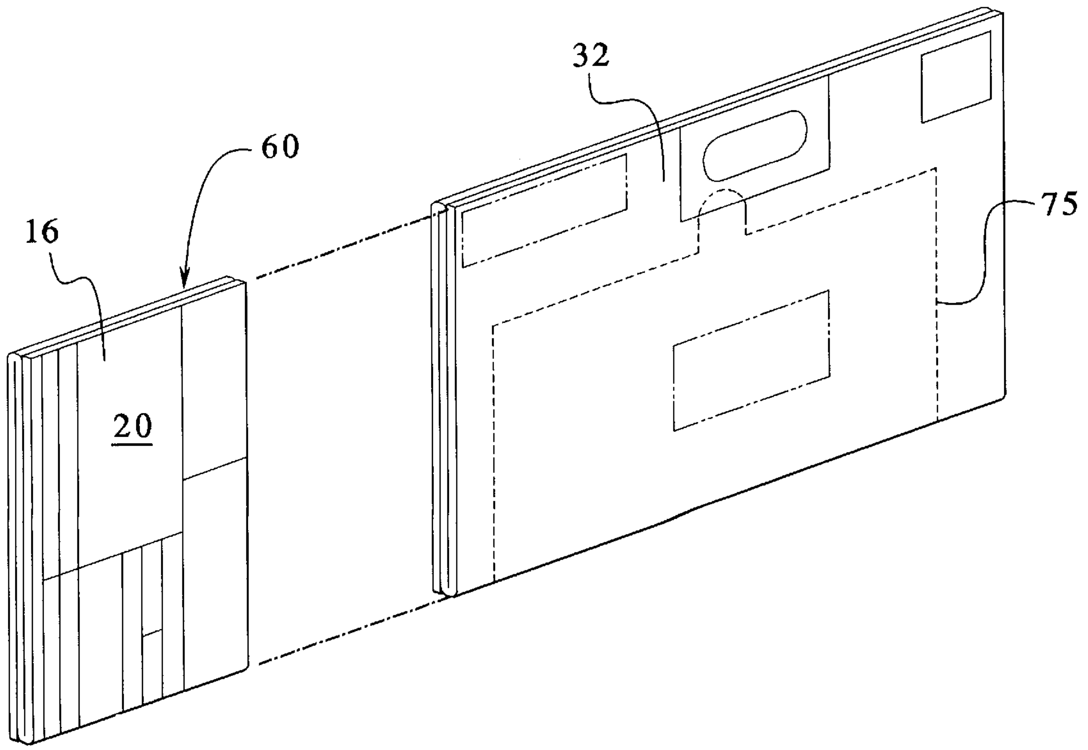
FIG. 4 illustrates a perspective view of the front side of an embodiment of the assembly of the present invention with a portion thereof detached.

FIG. 4 illustrates a front view of the assembly having the return postcard 16 and the delivery notice/reminder/receipt 60 illustrated as having been detached from the perforated tear line 48. Although both the return receipt 16 and the delivery notice receipt 60 are shown detached together from the envelope 32, the present invention provides that the delivery notice/reminder/receipt 60 can be separately detached from, and independent of, the return postcard 16. In this manner, the delivery notice/reminder/receipt 60 may be left with the addressee in the event of an unsuccessful delivery attempt.

Figure 5:
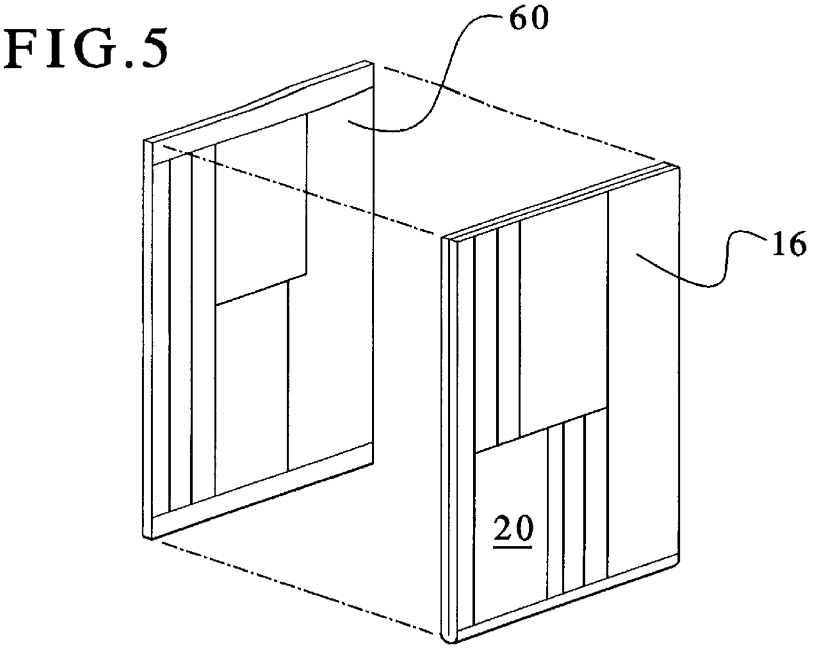
FIG. 5 illustrates a perspective view of the front side of an embodiment of a detached portion of the assembly of the present invention.

FIG. 5 illustrates the separated return postcard 16 and the delivery notice/reminder/receipt 60, having been removed from the envelope section 32 of the assembly 10 by the postal employee tearing the assembly at the perforated tear line 48.

Figure 6:
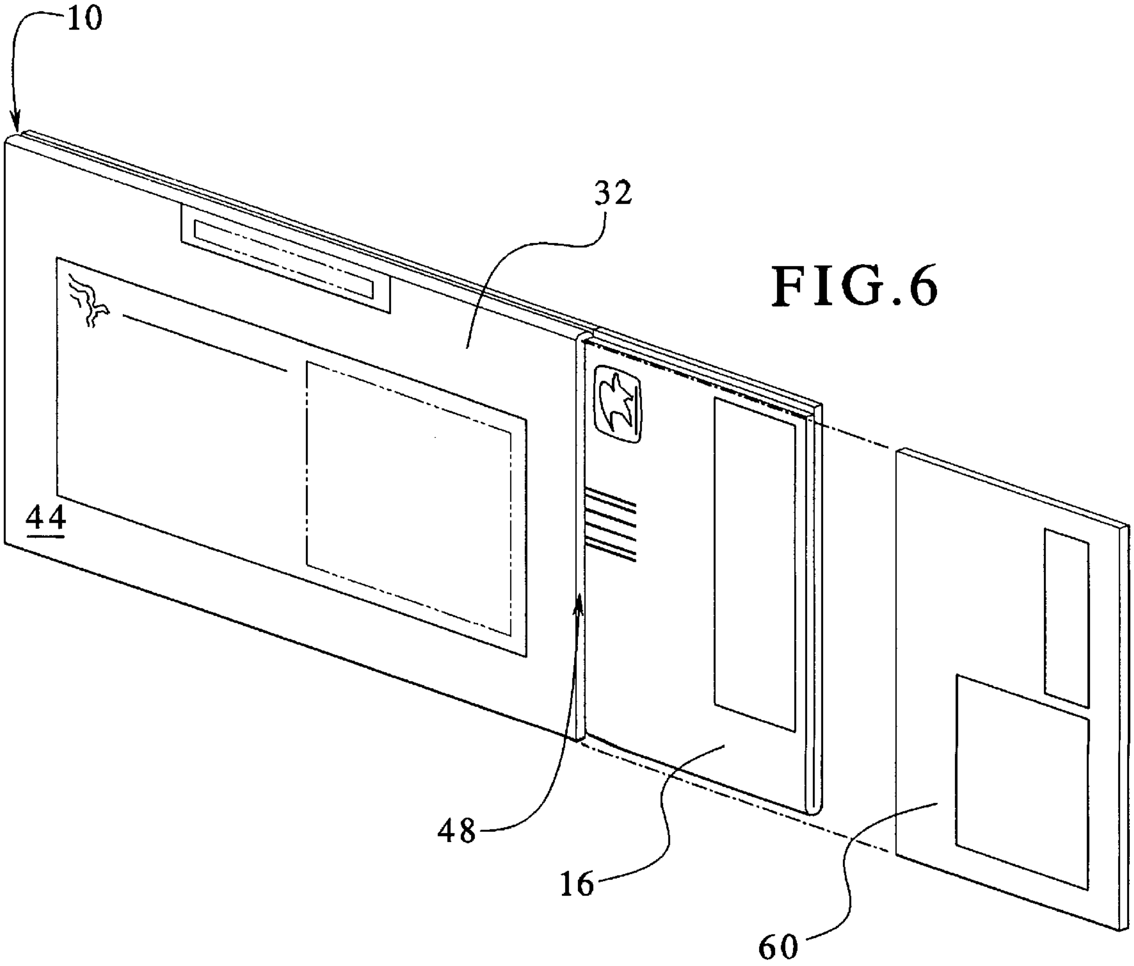
FIG. 6 illustrates a perspective view of the back side of an embodiment of the assembly of the present invention with a portion thereof detached.

FIG. 6 illustrates the back side 44 of the envelope 32 wherein the delivery notice/reminder/receipt 60 has been removed from the envelope 32 of the assembly 10. This is accomplished by the postal employee after an attempt to deliver the mailpiece by tearing the delivery notice/reminder/receipt 60 from the assembly 10 along the perforated tear line 48. The postal employee can then leave the delivery notice/reminder/receipt 60 at the addressee's address while the return postcard 16 remains attached to the assembly 10 until the actual delivery is completed.

The present invention provides the advantage that the sections on the sheet of the mailpiece are arranged such that all of the variable printing can be done on one side of the sheet. This is an especially convenient feature when automated printers are used in the processing of the mailpiece. If no message is required in the document section 74, all printing can be done on the side of the sheet shown in FIG. 1 by including the entire message in document section 14. As shown in FIG. 1, the areas of variable printing to be done, (i.e. printing in areas 14, 34, 36, 42, 52 and 56) are all located on the same side of the sheet 12.

As an added advantage of the present invention, the delivery notice/reminder/receipt 60 located on the assembly 10 is of course removable and, thus, can also serve as a postal receipt. That is, the section includes the corresponding bar-coded article number 61 and a signature and date line wherein the receiver may sign on the line and date the same. Then, the postal employee or other designated sender may retain the sub-section within its records indicating the article number and the date on which the assembly 10 was received as attested to by the signature of the receiver.

In addition, the embodiment of the present invention shown in the FIGS. 1–6 shows the return postcard 16 and the delivery notice/reminder/receipt 60 perpendicularly oriented to the envelope 32. Of course other orientations of the elements of the mailpiece are possible. Such other orientations are intended to be covered by the claims herein.

Referring now to FIGS. 7–11, another embodiment of a system 100 is illustrated for preparation of special service mailings. In the embodiment illustrated, the system 100 includes three sections 102, 104 and 106 wherein the sections 102, 104 and 106 are separated by perforated tear lines 108 and 110. The sections 102 and 104 provide an area generally designated at 112 and 114, respectively, in which a message may be printed or otherwise represented. The section 106 includes a return postcard 116 that likewise may be printed with information relating to receipt of delivery of the mailer. To this end, a "Return To" section 118 is provided which likewise may be printed during the printing of the areas 112, 114.

The system 100 is assembled by folding the section 102 at the perforated tear line 108 in the manner shown in FIG. 8 such that the areas 112, 114 are enclosed within the system 100. Then, the section 106 is folded as illustrated in FIG. 9 (with the return postcard 116 broken away) such that the system 100 is enclosed. An adhesive (not shown) may be provided exterior to perforations on edges of the system 100 to enclose and seal the system 100. Alternatively, a machine may be used to apply an adhesive around a periphery of the system 100 outside the perforations at the edges of the system 100. The application of an adhesive may be implemented by those skilled in the art. Still further, a material may be incorporated in the system 100 having a self-adhesive wherein pressure applied to the exterior of the system 100 at points containing the self-adhesive results in adhesion thereat.

Likewise, the areas 120, 122 just outside the return postcard 116 also require adhesive material. These areas 120, 122 of the section 106 are, therefore, non-removable from the system 100 during separation of the return postcard 116 from the remainder of the system 100 as illustrated in FIG. 9.

Perforated tear lines 124, 126 provided along a length of the system define an area which require removal from the remainder of the system 100. Therefore, after the system 100 is mailed, the return postcard 116 is first removed upon receipt. Then, to reveal the areas 112, 114 of the sections 102, 104, respectively, the perforated tear lines 124, 126 are folded such that the sections 129, 130 can be removed from the sides of the system 100. Then, a bottom section 131 is from a removable from a remainder of the system 100 by folding along a perforated tear line 132 in the section 106 which has corresponding perforated tear lines 134 and 136 which align with the perforated tear line 132 allowing removal of the bottom section 131 of the system 100.

As illustrated in FIGS. 8 and 9, a designating section 138 is provided for indicating the special type of service, such as certified mail, insured mail, return receipt for merchandise, registered mail, or the like. The designating section 138 extends on two sides of the system 100, namely on the backside of the section 102 and the backside of the section 104 wherein the front side is the visible portion illustrated in FIGS. 7 and 10. The designating section 138 may be pre-printed on the system 100 or may be separately printed or labeled following formation of the system 100.

Figure 10:
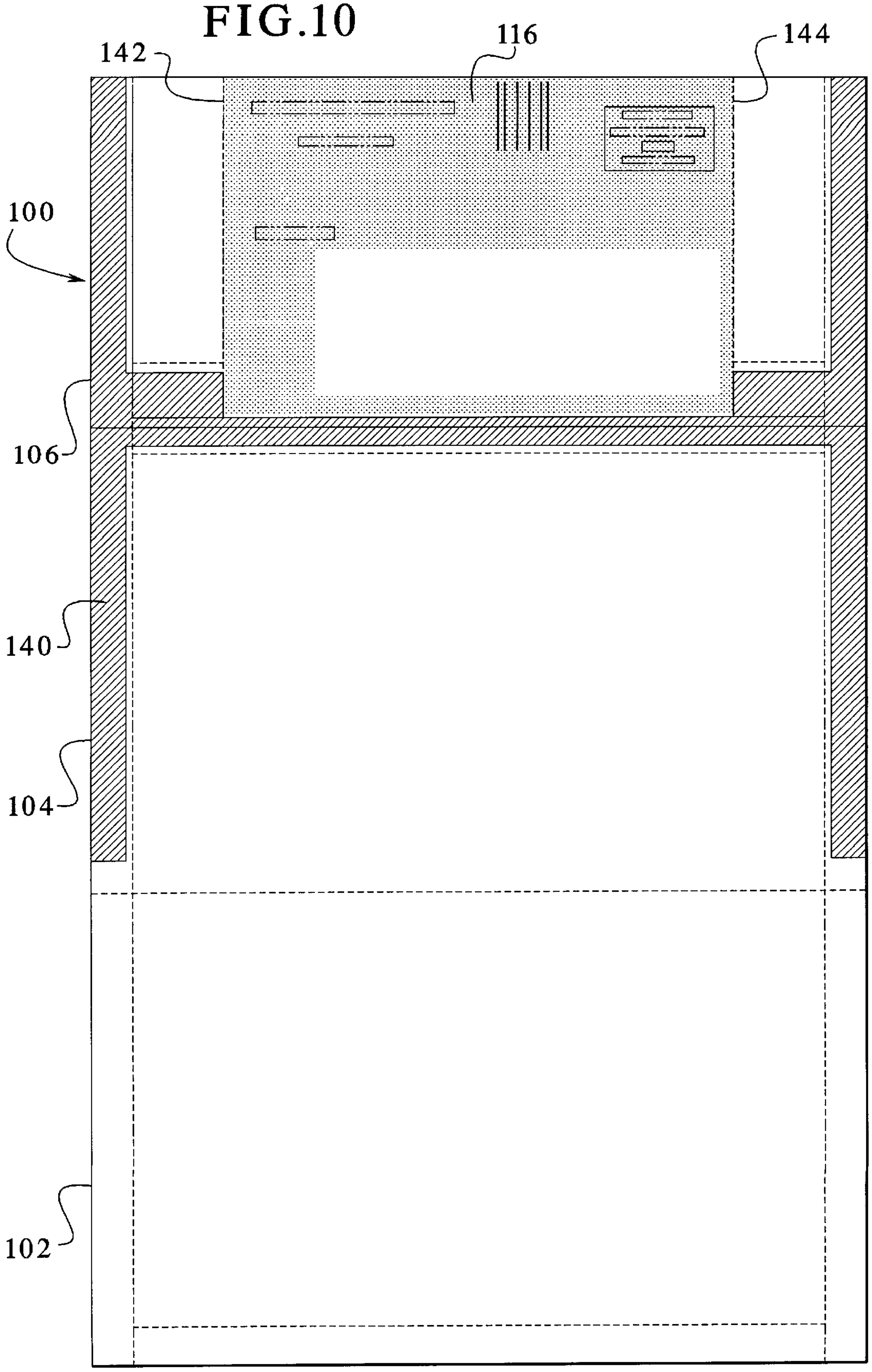
FIG. 10 illustrates a plan view of an embodiment of the system illustrated in FIGS. 7–9.

Referring now to FIG. 10, a front side of the system 100 is illustrated. The sections 102, 104 and 106 are illustrated with shaded areas designated in which of the sections 104, 106 adhesive is required. The shaded areas generally designated at 140 in FIG. 10 are the areas in which adhesive is required. As previously set forth, the shaded areas 140 may be pre-applied to the system 100 or may be separately applied using available machinery for application of adhesive prior to folding and sealing of the system 100. As further illustrated in FIG. 10, perforated lines 142, 144 are incorporated to assist in removal of the return postcard 116 from the section 106.

Referring now to FIGS. 11–15, an alternative embodiment for a particular special service mailing is illustrated. In the illustrated embodiment, a system 200 is shown in which a certified money order is incorporated therewith. Like the system 100 illustrated with reference to FIGS. 7–10, the system 200 includes three sections 202, 204 and 206 separated by perforated tear lines 208, 210. Folds are made at the perforated tear lines 208,210 as shown in FIGS. 11 and 12 to enclose a money order 212 following folding at the perforated tear lines 208, 210 enclosing the system 200 as shown in FIG. 13 prior to removal of a return postcard 214.

The system 200 includes additional perforated tear lines 216 around a periphery of the money order 212 such that the money order 212 can also be removed from the system 200 following delivery and receipt of the system 200. The money order 212 is incorporated into the system 200 such that information concerning to whom the money order 212 is addressed and the amount of the money order 212 remain enclosed in the system 200 following removal of the return postcard. The reverse side of the money order 212 is only exposed following removal of the return postcard 214 as illustrated in FIG. 13. The reverse side of the money order 212 has a line 218 for endorsement signature. Therefore, no additional information is revealed following removal of the return postcard 214.

Like the system 100, the system 200 also incorporates a designating section 220 indicative of the special service, in this case, "certified money order." The perforated tear lines are constructed and used in the system 200 identically to that shown and described with reference to FIGS. 7–10.

Figure 14:
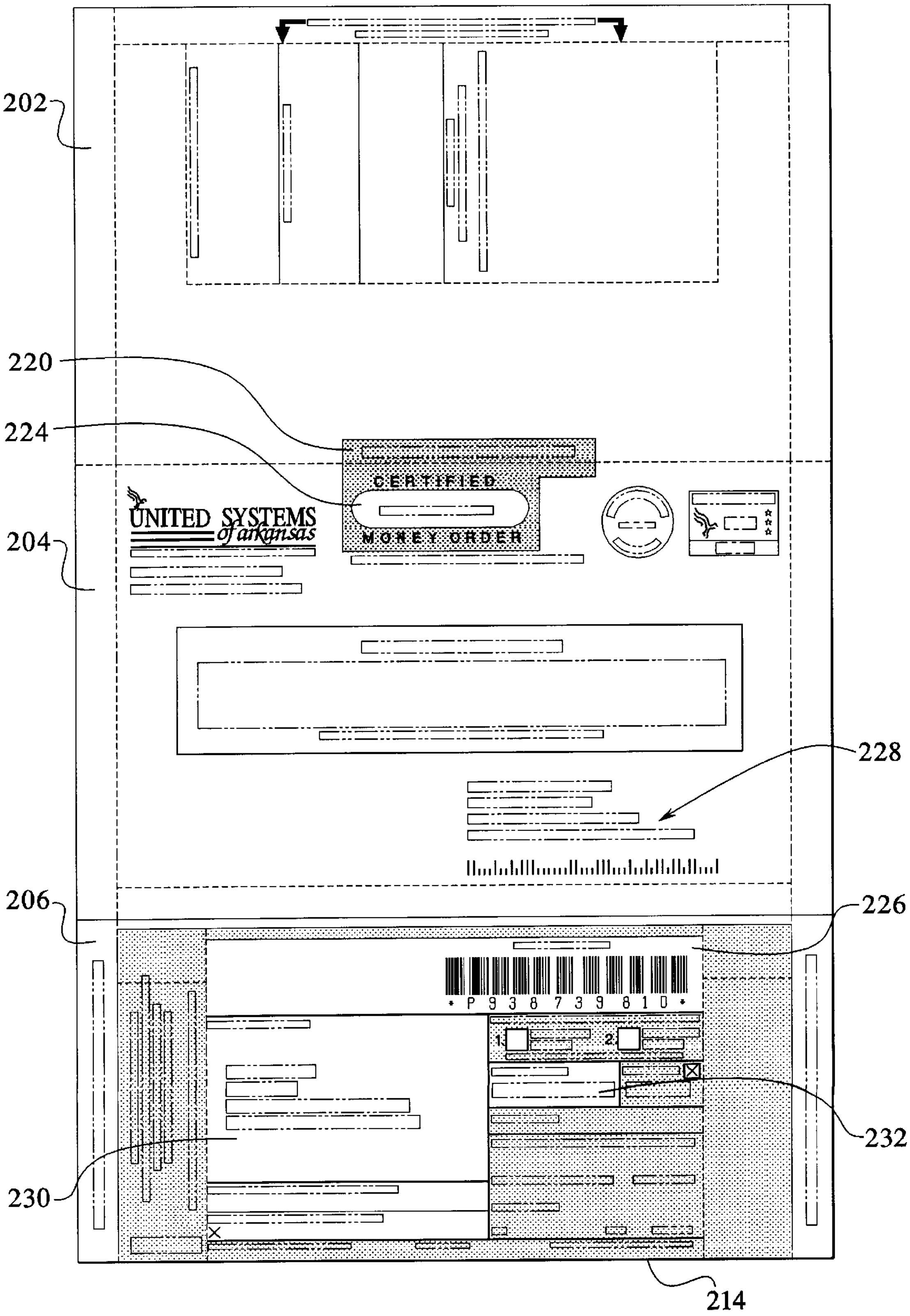
FIG. 14 illustrates a plan view of the system illustrated in FIGS. 11–13.
Figure 15:
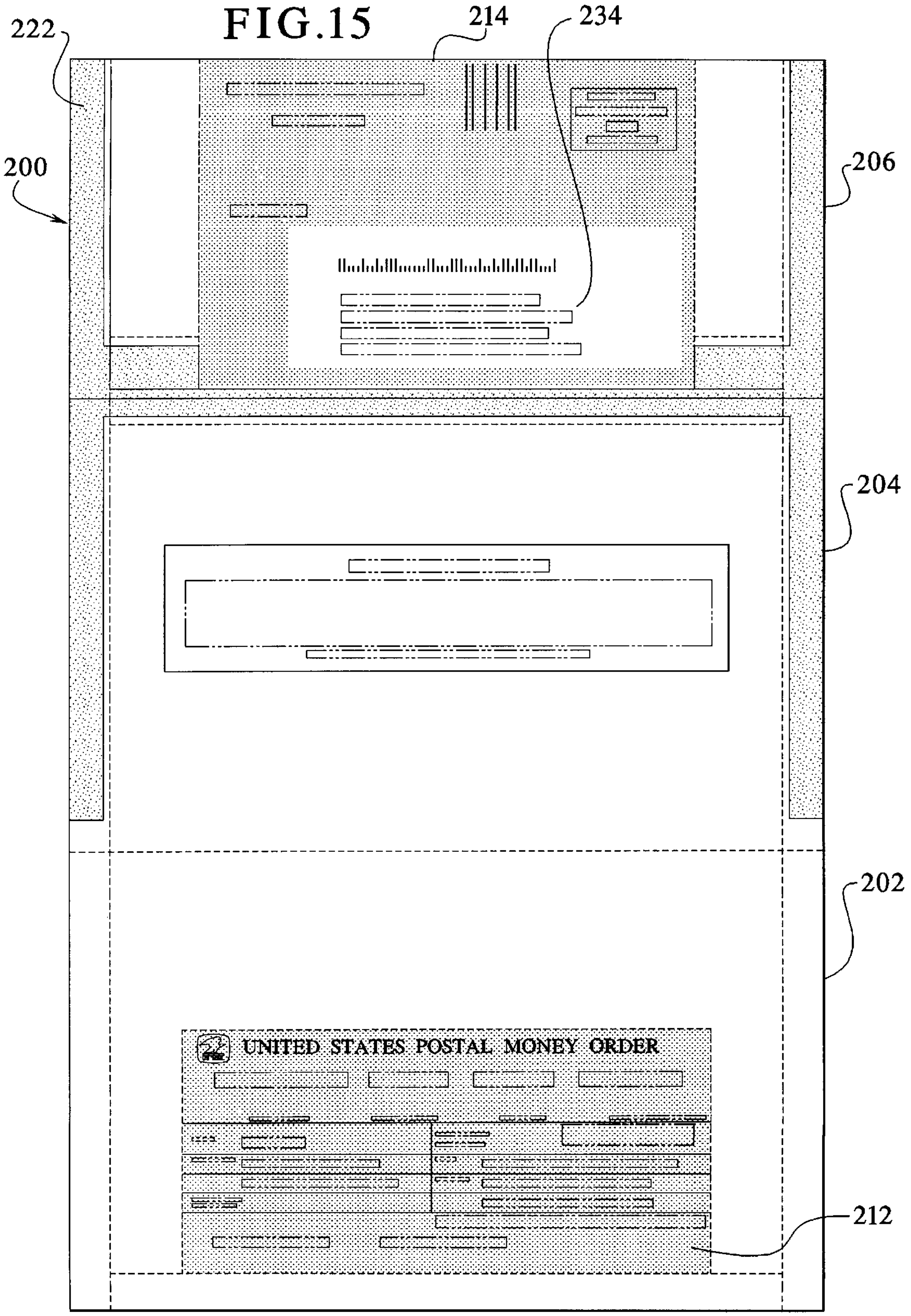
FIG. 15 illustrates a plan view of the embodiment illustrated in FIGS. 11–13 and the reverse side of that shown in FIG. 14.

Likewise, as illustrated in FIG. 15, adhesive areas 222 are incorporated such that the adhesive does not interfere with the money order 212 following folding and enclosing of the system 200. Referring to FIGS. 14 and 15, the sections 202, 204, 206 on a rear face of the system 200 include areas in which information regarding delivery of the system 200 is required. Namely, an area 224 in the designating section 220 requires an article identification number to be printed that corresponds to the number printed and bar coded on the return postcard 214 in the area 226. Likewise, in the section 204, an address for delivery of the certified money order is printed in an area generally designated at 228. Likewise, the same address as in the area 228 is printed in the area 230 of the return postcard 214. Further, the article number is also printed in an area 232 of the return postcard 214.

A front side of the system 200 is illustrated in FIG. 15 which includes an area 234 of the return postcard 214 that requires printing of information with respect to who received receipt of delivery of the system 200 including the incorporated money order 212.

Figure 16:
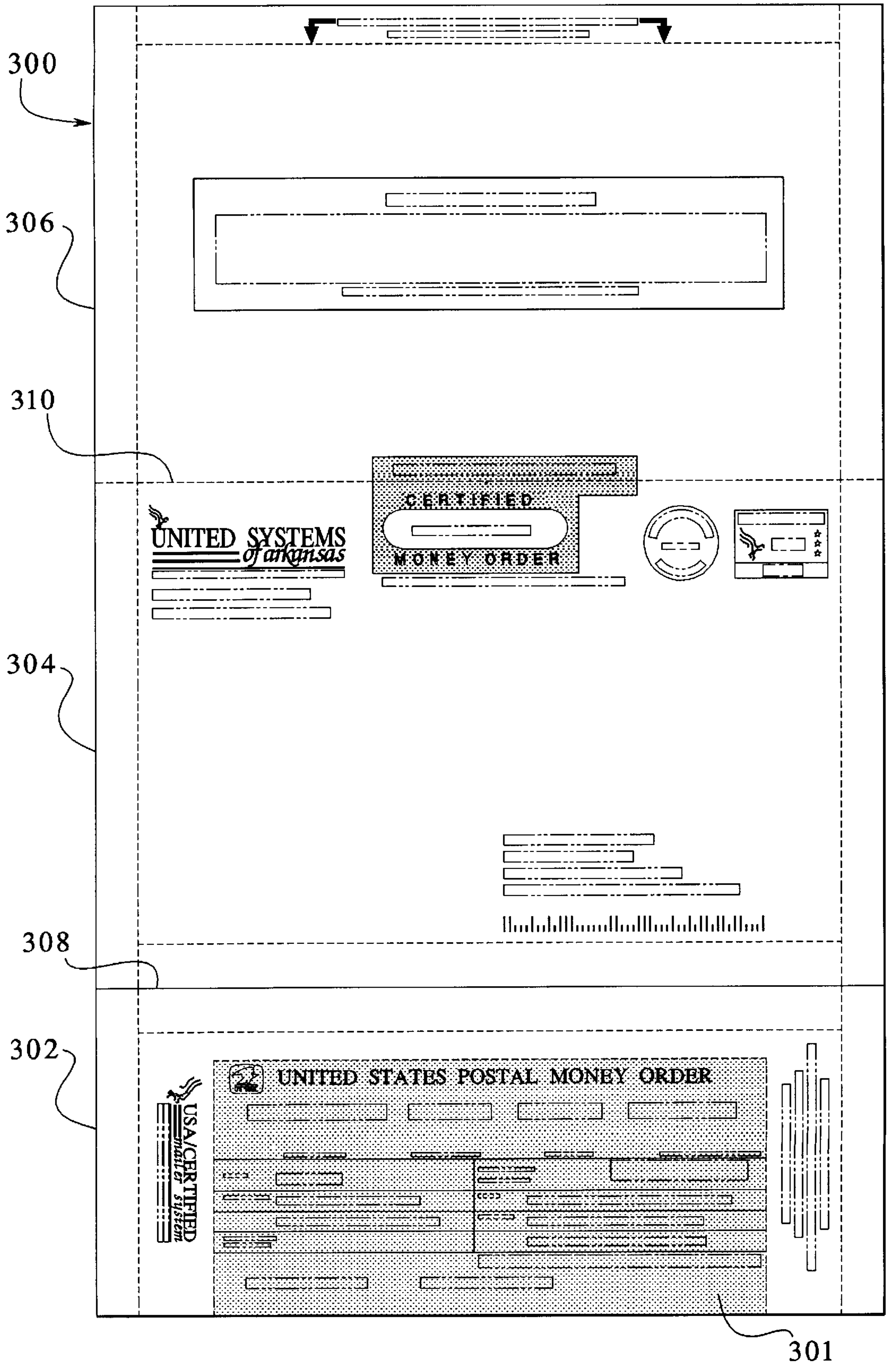
FIG. 16 illustrates a plan view of another embodiment of the system of the present invention.

Finally, referring now to FIG. 16, another embodiment of the system 200 shown in FIGS. 11–15 is illustrated. A system 300 is shown which incorporates a money order 301; the system 300, however, does not include a return postcard as shown and described with reference to FIGS. 11–15. Again, the system 300 include three sections 302, 304, and 306. The sections 302, 304 and 306 are separated by perforated tear lines 308, 310. The adhesive areas required for securing the sections and enclosing the certified money order 301 are illustrated with reference to FIG. 17. The money order 301 is printed with information relating to who the money order 301 is payable. In addition, section 304 is printed with information as to who the certified money order 301 is to be delivered.

Figure 17:
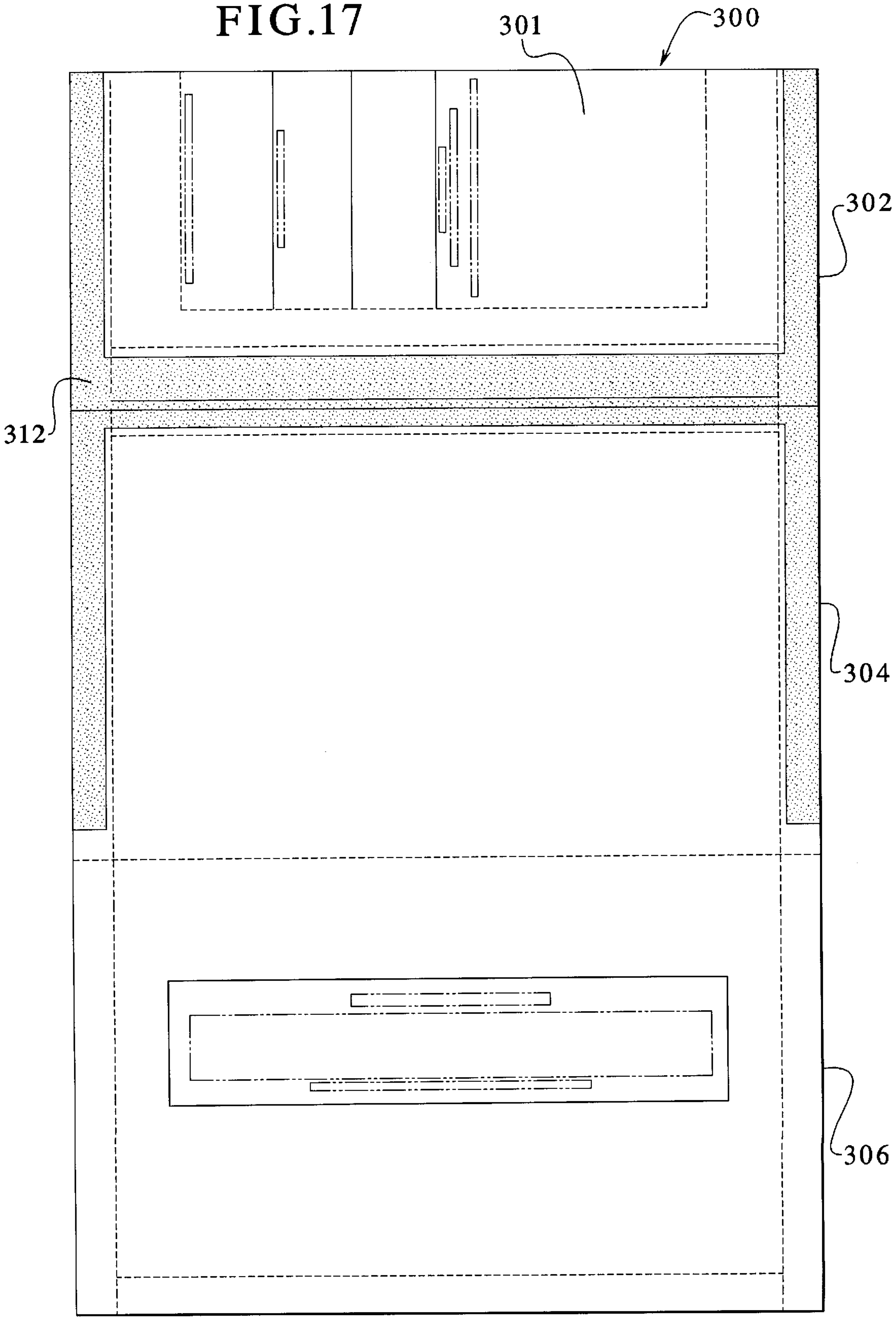
FIG. 17 illustrates a plan view of the embodiment of the system illustrated in FIG. 16 on its reverse side.

The inverse side of the system 300 is illustrated in FIG. 17. The adhesive areas 312 are arranged such that no interference with the money order 301 results. In addition, complete enclosure of the money order 301 in the system 300 results by folding and adhering in the designated adhesive areas 312.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for assembling and using a mailpiece requiring delivery by a special service, the method comprising the steps of:

providing a sheet having a length defined between a first end and a second end and further having a front side and a back side capable of receiving printed information thereon;

dividing the sheet into a first section at the first end, a second section, and a third section at the second end wherein the second section is between the first section and the third section and further wherein the sections are separated by first tear lines perpendicularly disposed with respect to the length of the sheet and further wherein the first section and the second section have an adhesive associated therewith;

folding the sheet at the first tear lines and sealing the first, second and third sections together via the adhesive to define a multi-layer mailpiece;

providing a first detachable portion defining a majority of the first section that is removable from a remainder of the sections wherein second tear lines extending a majority of a length of the first section are provided on each side of the first detachable portion defining two sides of the first detachable portion wherein the first detachable portion is a complete layer of the first section; and removing the first detachable portion from the first section wherein an open area is provided in the first detachable portion between the second tear lines following removal.

2. The method of claim 1 wherein the first detachable portion is a return postcard having an identifier indicative of a special service printed on the return postcard.

3. The method of claim 1 wherein the first detachable portion is a money order having information related to an amount of money printed on the money order.

4. The method of claim 1 further comprising the step of:

providing a second detachable portion in another one of the sections removable from a remainder of the another one of the sections.

5. The method of claim 1 further comprising the step of:

providing a designation on one side of the sheet indicative of the special service required for the mailpiece.

* * * * *